(12) United States Patent
Vardaro

(10) Patent No.: US 11,592,879 B2
(45) Date of Patent: Feb. 28, 2023

(54) MODULAR BACK PANEL ASSEMBLY FOR A DISPLAY STRUCTURE

(71) Applicant: Enzo Vardaro, Montreal (CA)

(72) Inventor: Enzo Vardaro, Montreal (CA)

(73) Assignee: ARTITALIA GROUP INC., Montreal (CA)

(*) Notice: Subject to any disclaimer, the term of this patent is extended or adjusted under 35 U.S.C. 154(b) by 109 days.

(21) Appl. No.: 16/940,074

(22) Filed: Jul. 27, 2020

(65) Prior Publication Data

US 2021/0026424 A1 Jan. 28, 2021

Related U.S. Application Data

(60) Provisional application No. 62/879,238, filed on Jul. 26, 2019.

(51) Int. Cl.
*G06F 1/18* (2006.01)
*G09F 9/302* (2006.01)
*G06F 1/16* (2006.01)
*A47F 5/10* (2006.01)

(52) U.S. Cl.
CPC .............. *G06F 1/189* (2013.01); *A47F 5/103* (2013.01); *G06F 1/1607* (2013.01); *G09F 9/3026* (2013.01)

(58) Field of Classification Search
CPC ...... G06F 1/189; G06F 1/1607; G09F 9/3026; A47F 5/103; A47F 11/10; A47B 2220/0077
See application file for complete search history.

(56) References Cited

U.S. PATENT DOCUMENTS

| 4,489,995 A | * | 12/1984 | Barr | .................. F25D 29/00 312/236 |
| 4,519,013 A | * | 5/1985 | Breeze | .................. H02B 1/56 211/26 |

(Continued)

FOREIGN PATENT DOCUMENTS

| EP | 3061367 A1 | * | 8/2016 | .............. A47F 11/10 |
| EP | 3075285 A1 | * | 10/2016 | .............. A47F 11/10 |

*Primary Examiner* — Stanton L Krycinski
(74) *Attorney, Agent, or Firm* — Praxis

(57) ABSTRACT

A modular back panel assembly for a display structure comprises at least one back panel defining front face apertures. The back panel rear face is comprises at least one elongated channel aligned with the front face apertures. An elongated electrical conductor is mountable within the elongated channel and defines conductor apertures for being coaligned with the front face apertures. A display member is mountable to the back panel front face of the back panel and comprises an electrical conductor with a mounting element that is insertable within the coaligned front face and conductor apertures. An electrical assembly provides electrical power to the elongated electrical conductor. Insertion of the mounting element within the coaligned front face and conductor apertures provides for mounting the display member to the front face and for electrical communication with the electrical conductor thus allowing the elongate electrical conductor when electrically powered by the electrical assembly to provide electrical power to the display member electrical conductor.

15 Claims, 6 Drawing Sheets

(56) References Cited

U.S. PATENT DOCUMENTS

| | | | |
|---|---|---|---|
| 4,689,726 A * | 8/1987 | Kretzschmar | F21S 4/20 362/127 |
| 5,348,485 A * | 9/1994 | Briechle | H01R 25/14 439/121 |
| 5,695,261 A * | 12/1997 | Slesinger | A47F 11/10 439/116 |
| 6,199,705 B1 * | 3/2001 | Portner | A47F 5/0846 211/94.01 |
| 6,520,355 B1 * | 2/2003 | Pritchard | A47B 96/04 211/187 |
| 6,527,406 B1 * | 3/2003 | Slesinger | A47F 11/10 362/132 |
| 6,698,597 B2 * | 3/2004 | Marihugh | A47F 5/04 211/133.1 |
| 8,191,672 B2 * | 6/2012 | Kondo | H04R 1/028 312/326 |
| 8,602,230 B2 * | 12/2013 | Bergdoll | A47B 57/16 211/59.3 |
| 8,646,935 B2 * | 2/2014 | Karan | A47F 1/126 362/240 |
| 8,979,296 B2 * | 3/2015 | Wiemer | F21V 23/06 362/125 |
| 8,985,352 B2 * | 3/2015 | Bergdoll | A47B 57/16 211/59.3 |
| 9,098,823 B2 * | 8/2015 | Slesinger | A47B 96/021 |
| 9,130,326 B2 * | 9/2015 | Meis | H05K 1/118 |
| 9,204,736 B2 * | 12/2015 | Lindblom | A47F 11/10 |
| 9,228,735 B2 * | 1/2016 | Liu | A47F 11/10 |
| 9,357,858 B2 * | 6/2016 | Sun | F21V 33/0012 |
| 9,404,645 B1 * | 8/2016 | Feng | A47B 57/36 |
| 9,420,901 B2 * | 8/2016 | Sun | A47F 5/103 |
| 9,537,274 B1 * | 1/2017 | Dankelmann | H01R 25/142 |
| 9,680,270 B2 * | 6/2017 | Wessel | H02B 1/20 |
| 9,774,134 B2 * | 9/2017 | Bonner | A47F 5/0018 |
| 9,831,642 B2 * | 11/2017 | Woodley | A47F 5/103 |
| 9,883,756 B2 * | 2/2018 | Kraiss | H02B 1/20 |
| 10,024,662 B2 * | 7/2018 | Bryan | H04N 9/3179 |
| 10,140,895 B2 * | 11/2018 | Jones | G06F 13/4081 |
| 10,184,622 B2 * | 1/2019 | Dong | F21V 23/06 |
| 10,201,227 B2 * | 2/2019 | Kohshima | H01R 33/18 |
| 10,432,001 B1 * | 10/2019 | Bellis | A47B 47/02 |
| 10,537,191 B2 * | 1/2020 | Ford | A47F 11/10 |
| 10,600,026 B2 * | 3/2020 | Jones | G06Q 20/203 |
| 10,617,229 B1 * | 4/2020 | Stafford | A47F 5/005 |
| 10,646,058 B2 * | 5/2020 | Jones | A47F 11/10 |
| 10,674,840 B2 * | 6/2020 | Haroush | A47F 7/024 |
| 10,939,756 B2 * | 3/2021 | Peck | A47B 96/024 |
| 11,068,873 B1 * | 7/2021 | Karthik | A47F 5/101 |
| 2004/0228122 A1 * | 11/2004 | Slesinger | A47F 11/10 362/127 |
| 2008/0121146 A1 * | 5/2008 | Burns | A47F 11/10 362/125 |
| 2009/0020601 A1 * | 1/2009 | Woodbury | G06Q 10/087 235/375 |
| 2010/0008072 A1 * | 1/2010 | Meier-Graichen | A47B 97/00 362/127 |
| 2011/0084627 A1 * | 4/2011 | Sloan | F21V 7/22 362/225 |
| 2011/0215212 A1 * | 9/2011 | Keyvanloo | A47B 96/1466 248/220.22 |
| 2012/0228240 A1 * | 9/2012 | Gentile | A47F 5/08 211/1 |
| 2014/0227893 A1 * | 8/2014 | Howard | H01R 25/142 439/121 |
| 2015/0036326 A1 * | 2/2015 | Maciulewicz | G09F 13/0413 362/133 |
| 2015/0201762 A1 * | 7/2015 | Walter | A47F 11/10 211/187 |
| 2017/0220987 A1 * | 8/2017 | Sun | G06Q 10/08 |
| 2018/0242761 A1 * | 8/2018 | Jones | A47F 11/10 |
| 2018/0255944 A1 * | 9/2018 | Ford | F21S 8/066 |
| 2019/0298083 A1 * | 10/2019 | Lee | A47F 3/00 |
| 2020/0229315 A1 * | 7/2020 | Mahlberg | A47B 47/00 |
| 2021/0007483 A1 * | 1/2021 | Zheng | A47B 96/025 |

* cited by examiner

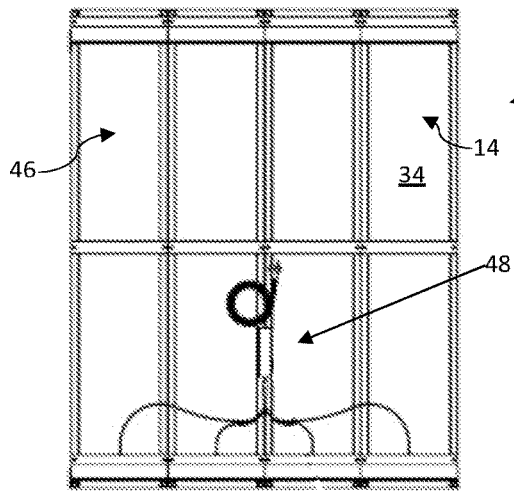
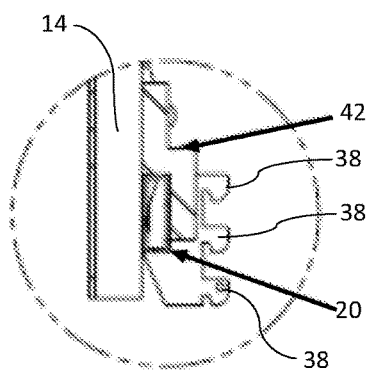
FIG. 8　　　　　　　FIG. 9
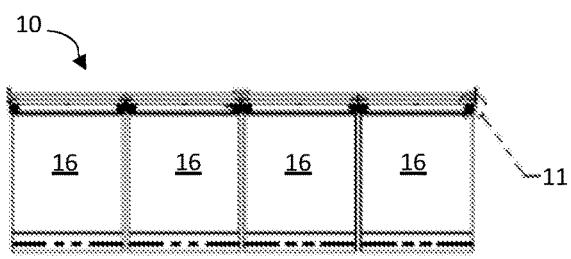
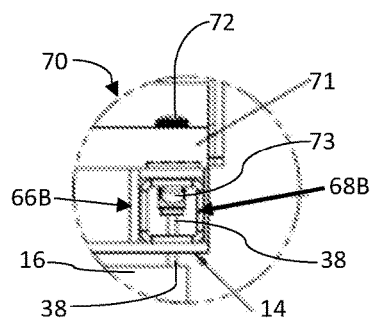
FIG. 10　　　　　　FIG. 11
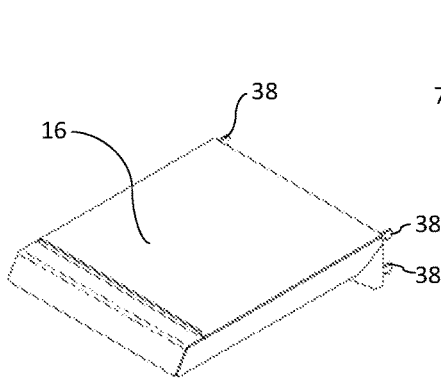
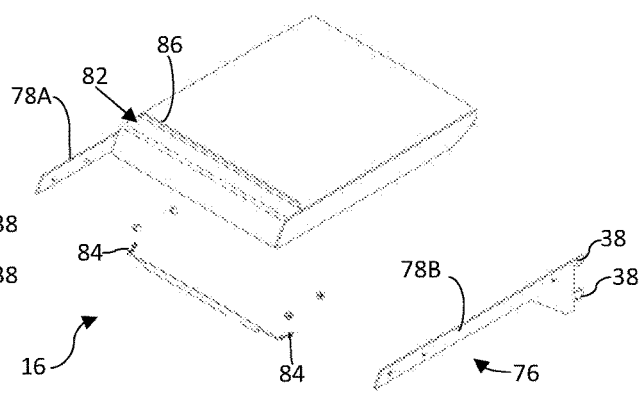
FIG. 12A　　　　　　FIG. 12B

MODULAR BACK PANEL ASSEMBLY FOR A DISPLAY STRUCTURE

CROSS-REFERENCE TO RELATED APPLICATIONS

The present application claims priority on U.S. Provisional Patent Application Ser. No. 62/878,238 filed on Jul. 26, 2019 and being incorporated herein by reference in its entirety.

TECHNICAL FIELD

The present disclosure generally relates to shelving and display structures for displaying items. More particularly, but not exclusively, the present disclosure relates to a modular back panel assembly for a display structure.

BACKGROUND

Display structures such as gondolas include freestanding fixtures used by retailers to display merchandise wall mounted structures, columns and other configurations suitable to properly display items. Some display structures include a base and a vertical frame such as a backing wall or panel featuring notches, pegboards, slatwalls. The vertical wall can be fitted with shelves, hooks, or other displays. The display structure ca be placed end-to-end can form rows of shelving or so positioned to form corners therebetween. Display structures can include backing wall structures that span the width thereof that are electrified in order to provide power to lights, signage and other articles requiring electricity in order to add to the overall display aesthetic as the user sees fit.

OBJECTS

An object of the present disclosure is to provide a modular back panel assembly for a display structure.

An object of the present disclosure is to provide a display structure assembly.

An object of the present disclosure is to provide a display structure.

SUMMARY

In accordance with an aspect of the present disclosure, there is provided a modular back panel assembly for a display structure, the modular back panel assembly comprising: at least one back panel for being mounted to the display structure and defining respective lateral sides, top and bottom ends, front and rear faces, a horizontal width between the lateral sides and a vertical height between the top and bottom ends, the front face defining front face apertures along the vertical height, the rear face being mountable to the display structure and comprising at least one elongated channel along the vertical height in alignment with the front face apertures; at least one elongated electrical conductor removably mountable within the elongated channel along the vertical height and defining conductor apertures for being coaligned with the front face apertures when the elongated electrical conductor is mounted within the elongated channel; at least one display member for being mounted to the front face of the back panel and comprising a display member electrical conductor comprising at least one mounting element being insertable within the coaligned front face and conductor apertures; and an electrical assembly for being in electrical communication with the elongated electrical conductor to provide electrical power thereto, wherein insertion of the mounting element within the coaligned front face and conductor apertures provides for mounting the display member to the front face and for electrical communication between the display member electrical conductor and the elongated electrical conductor for allowing the elongate electrical conductor when electrically powered by the electrical assembly to provide electrical power to the display member electrical conductor.

In accordance with an aspect of the present disclosure, there is provided a display structure assembly comprising: a frame structure assembly; and a modular back panel assembly for being mounted to the frame structure, the modular back panel assembly comprising: at least one back panel for being mounted to the frame structure assembly and defining respective lateral sides, top and bottom ends, front and rear faces, a horizontal width between the lateral sides and a vertical height between the top and bottom ends, the front face defining front face apertures along the vertical height, the rear face being mountable to the display structure and comprising at least one elongated channel along the vertical height in alignment with the front face apertures; at least one elongated electrical conductor removably mountable within the elongated channel along the vertical height and defining conductor apertures for being coaligned with the front face apertures when the elongated electrical conductor is mounted within the elongated channel; at least one display member for being mounted to the front face of the back panel and comprising a display member electrical conductor comprising at least one mounting element being insertable within the coaligned front face and conductor apertures; and an electrical assembly for being in electrical communication with the elongated electrical conductor to provide electrical power thereto, wherein insertion of the mounting element within the coaligned front face and conductor apertures provides for mounting the display member to the front face and for electrical communication between the display member electrical conductor and the elongated electrical conductor for allowing the elongate electrical conductor when electrically powered by the electrical assembly to provide electrical power to the display member electrical conductor.

In an embodiment of the assembly, the at least one back panel comprises at least two elongated channels on the rear face thereof along the vertical height respectively positioned at or near a respective one of the lateral sides and respectively aligned with respective ones of the front face apertures. In an embodiment, there are provided at least two elongated electrical conductors defining respective conductor apertures and being respectively mountable to respective ones of the at least two elongated channels along the vertical height for aligning the respective conductor apertures thereof with the respective ones of the front face apertures.

In an embodiment of the assembly, there are provided a plurality of the back panels for being mounted side by side to the display structure, the electrical assembly being mountable to the back panel assembly at the rear faces of the plurality of the back panels and comprising a power input connected to a driver connected to a cable assembly comprising connecting ends for being in electrical communication with the elongated electrical conductor of each one of the plurality of the back panels to provide electrical power thereto. In an embodiment of the assembly, there is provided a connecting member mountable to the elongated channel of each one of the plurality of the back panels rear faces of the plurality of back panels and in electrical communication with the connecting ends of the cable assembly.

In an embodiment of the assembly, the at least one display member comprises an electrical element for further providing electrical power to another article.

In accordance with an aspect of the present disclosure, there is provided a display structure comprising: a frame structure assembly; and a modular back panel assembly mounted to the frame structure, the modular back panel assembly comprising: at least one back panel mounted to the frame structure and defining respective lateral sides, top and bottom ends, front and rear faces, a horizontal width between the lateral sides and a vertical height between the top and bottom ends, the front face defining front face apertures along the vertical height, the rear face being mounted to the display structure and comprising at least one elongated channel along the vertical height in alignment with the front face apertures; at least one elongated electrical conductor mounted within the elongated channel along the vertical height and defining conductor apertures being coaligned with the front face apertures; at least one display member mounted to the front face of the back panel and comprising a display member electrical conductor comprising at least one mounting element inserted within the coaligned front face and conductor apertures; and an electrical assembly being in electrical communication with the elongated electrical conductor to provide electrical power thereto, wherein the mounting element within the coaligned front face and conductor apertures provides for mounting the display member to the front face and for electrical communication between the display member electrical conductor and the elongated electrical conductor for allowing the elongate electrical conductor when electrically powered by the electrical assembly to provide electrical power to the display member electrical conductor.

In an embodiment of the display structure, the at least one back panel comprises at least two elongated channels on the rear face thereof along the vertical height respectively positioned at or near a respective one of the lateral sides and respectively aligned with respective ones of the front face apertures. In an embodiment of the display structure, there is provided at least two elongated electrical conductors defining respective conductor apertures and being respectively mounted to respective ones of the at least two elongated channels along the vertical height and wherein the respective conductor apertures thereof are aligned with the respective ones of the front face apertures.

In an embodiment of the display structure, there is provided a plurality of the back panels mounted side by side to the display structure, the electrical assembly mounted to the back panel assembly at the rear faces of the plurality of the back panels and comprising a power input connected to a driver connected to a cable assembly comprising connecting ends in electrical communication with the elongated electrical conductor of each one of the plurality of the back panels to provide electrical power thereto. In an embodiment of the display structure, there is provided a connecting member mounted to the elongated channel of each one of the plurality of the back panels rear faces of the plurality of back panels and in electrical communication with the connecting ends of the cable assembly.

In an embodiment of the display structure, the at least one display member comprises an electrical element for further providing electrical power to another article.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 8 is a rear face view of the display structure of FIG. 4;

FIG. 9 is an enlarged view of portion 9 of FIG. 7;

FIG. 10 is a top plan view of the display structure of FIG. 4;

FIG. 11 is an enlarged view of portion 11 of FIG. 10;

FIG. 12A is a perspective view of the display member of the display structure of FIG. 1, 2, 3 or 4;

FIG. 12B is an exploded view of the display member of FIG. 12A;

DETAILED DESCRIPTION OF ILLUSTRATIVE EMBODIMENTS

Figure 1:
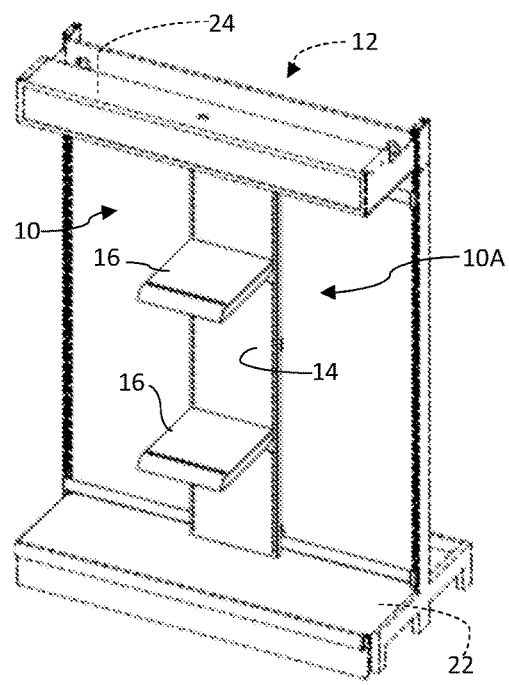
FIG. 1 is a perspective view of a display structure including a modular back assembly in accordance with a non-restrictive illustrative embodiment of the present disclosure.
Figure 2:
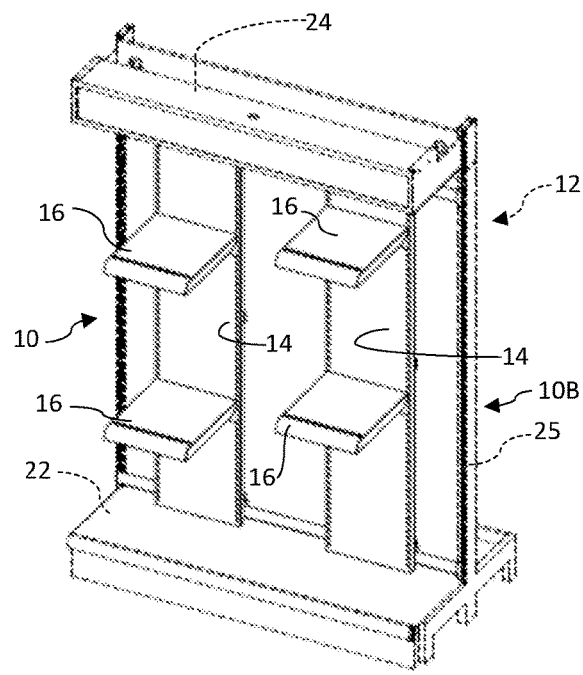
FIG. 2 is a perspective view of a display structure including a modular back assembly in accordance with another non-restrictive illustrative embodiment of the present disclosure.
Figure 3:
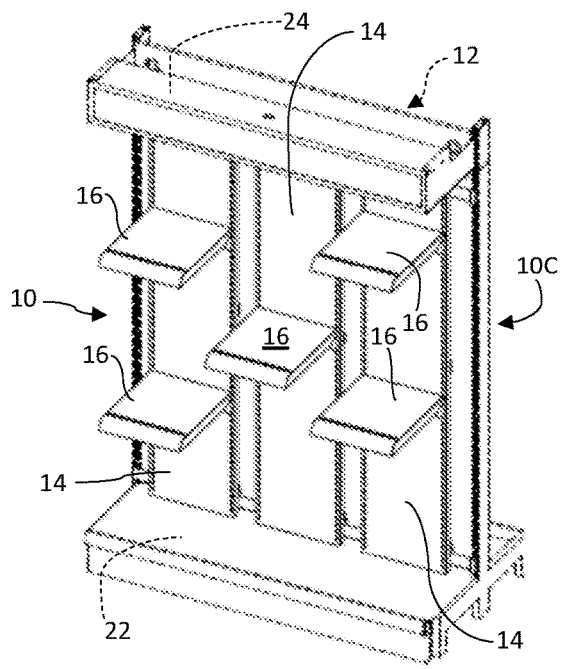
FIG. 3 is a perspective view of a display structure including a modular back assembly in accordance with a further non-restrictive illustrative embodiment of the present disclosure.
Figure 4:
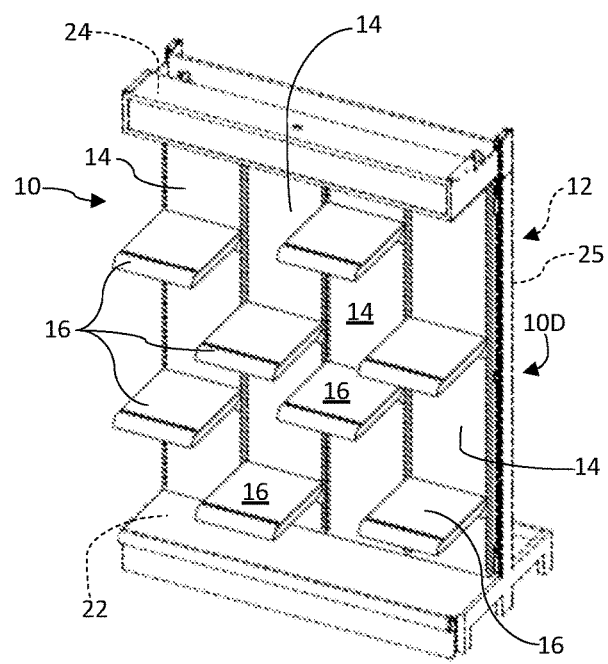
FIG. 4 is a perspective view of a display structure including a modular back assembly in accordance with yet another non-restrictive illustrative embodiment of the present disclosure.

Generally stated and in accordance with an aspect of the present disclosure, there is provided a modular back panel assembly for a display structure. The modular back panel assembly comprises at least one back panel, at least one elongated electrical conductor, at least one display member, and an electrical assembly. The back panel is mounted to the display structure and defines lateral sides, top and bottom ends, front and rear faces, a horizontal width and a vertical height. The front face defines front face apertures along the vertical height. The rear face is mountable to the display structure and comprises at least one elongated channel along the vertical height in alignment with the front face apertures. The elongated electrical conductor is removably mountable within the elongated channel along the vertical height and defines conductor apertures for being coaligned with the front face apertures when the elongated electrical conductor is mounted within the elongated channel. The display member is mounted to the front face of the back panel and comprises a display member electrical conductor comprising at least one mounting element that is insertable within the coaligned front face and conductor apertures. The electrical assembly is in electrical communication with the elongated electrical conductor to provide electrical power thereto. Insertion of the mounting element within the coaligned front face and conductor apertures provides for mounting the display member to the front face and for electrical communication between the display member electrical conductor and the elongated electrical conductor for allowing the elongate electrical conductor when electrically powered by the electrical assembly to provide electrical power to the display member electrical conductor.

The back panel assembly provides for being powered by whatever configuration the user adopts. The back panel assembly provides for powering the display members such as shelves to light them up or to light up other articles connected to the shelves or the back panels. Thus, the display members herein can be provided with a variety of light elements or other power-requiring elements such as sensors, speakers, microphones, robotic structures and the like to enhance the shopping and displaying experience as the user sees fit. Accordingly, the panels may also include similar power-requiring elements. Thus the term "display member" includes any element mountable to the back panel for displaying.

FIGS. 1, 2, 3 and 4, show the back panel assembly 10 mounted to a display structure 12. The back panel assembly 10 is modular and can be provided in a variety of suitable configurations, such as assemblies 10A, 10B, 10C and 10D respectively shown in FIGS. 1, 2, 3 and 4.

In this example, the display structure is a gondola. It should be noted that the term "gondola" refers to any fixture that provides for displaying merchandise. A gondola is usually free standing but may also be secured to a wall. A gondola usually has shelves but may also include other displaying elements. The term "gondola" herein is not used herein in a limited way and generally refers to the various display structures used in shops for displaying merchandise.

With reference to FIGS. 1-4 and 5, the modular back panel assembly 10 comprises one or more separate back panels 14 for mounting shelves 16 thereto. Each panel is mounted to a top hang bar 18 and a bottom support bar 20. The bars 18 and 20 are mounted to the top and bottom parts respectively of the display structure 12. The display structure 12 upstands from a base 22 and includes a header 24 as is known in the art.

Figure 6:
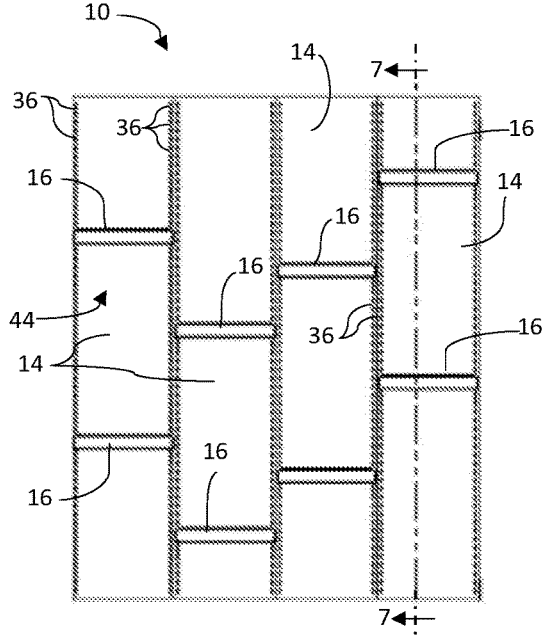
FIG. 6 is a front elevation view of the display structure of FIG. 4.
Figure 7:
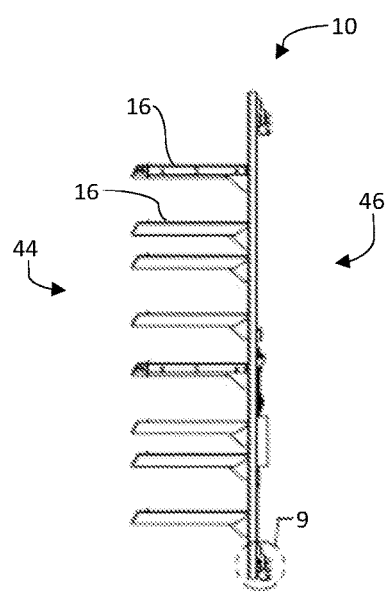
FIG. 7 is a lateral sectional view taken along line 7-7 of FIG. 6.
Figure 13:
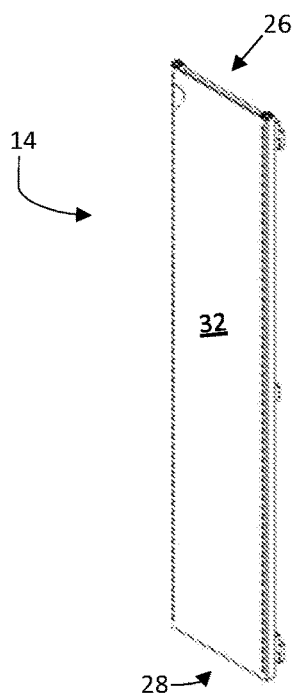
FIG. 13 is a perspective view of the back panel of the display structure of FIG. 1, 2, 3 or 4.
Figure 14:
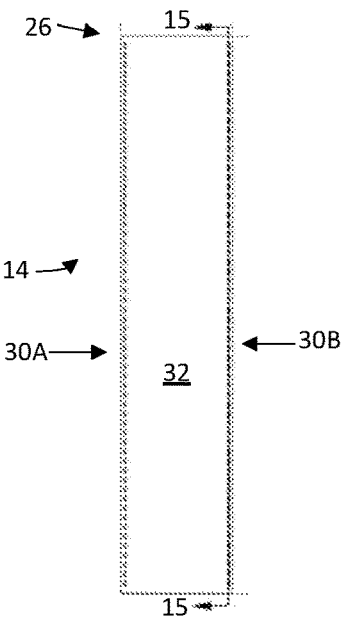
FIG. 14 is a front elevation view of the back panel of FIG. 13.
Figure 15:
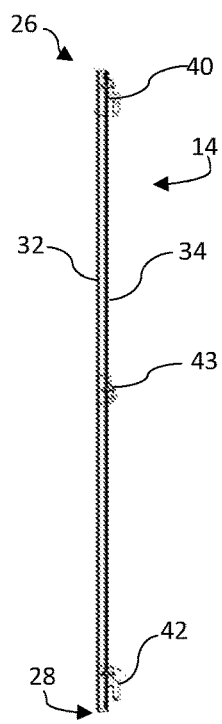
FIG. 15 is a lateral section view taken along line 15-15 of FIG. 14.

With particular reference to FIGS. 13-16, each back panel 14 defines top and bottom ends 26 and 28, respectively, opposite lateral sides 30A and 30B and front and rear faces, 32 and 34 (see also FIG. 8), respectively. The horizontal width of the back panel 14 is defined between the lateral sides 30A and 30B and the vertical height of the back panel 14 is defined between the top and bottom ends 26 and 28, respectively. The front face 32 includes front face apertures 36 for receiving respective mounting elements 38 (see FIG. 12) of a display member 16. The rear face 34 of back panel 14 includes a top hook 40 for being mounted to the top bar 18 and a bottom hook 42 for being mounted to the bottom bar 20 (see FIGS. 7 and 9). The front faces 32 of the separate back panels 14 of an assembly 10 define the front face 44 (see FIGS. 6 and 7) of the assembly 10 which in turn is the front face of the display structure 12. The rear faces 34 of the separate back panels 14 of an assembly 10 define the rear face 46 (see FIGS. 7 and 8) of the assembly 10 which in turn is the rear face of the display structure 12.

Figure 5:
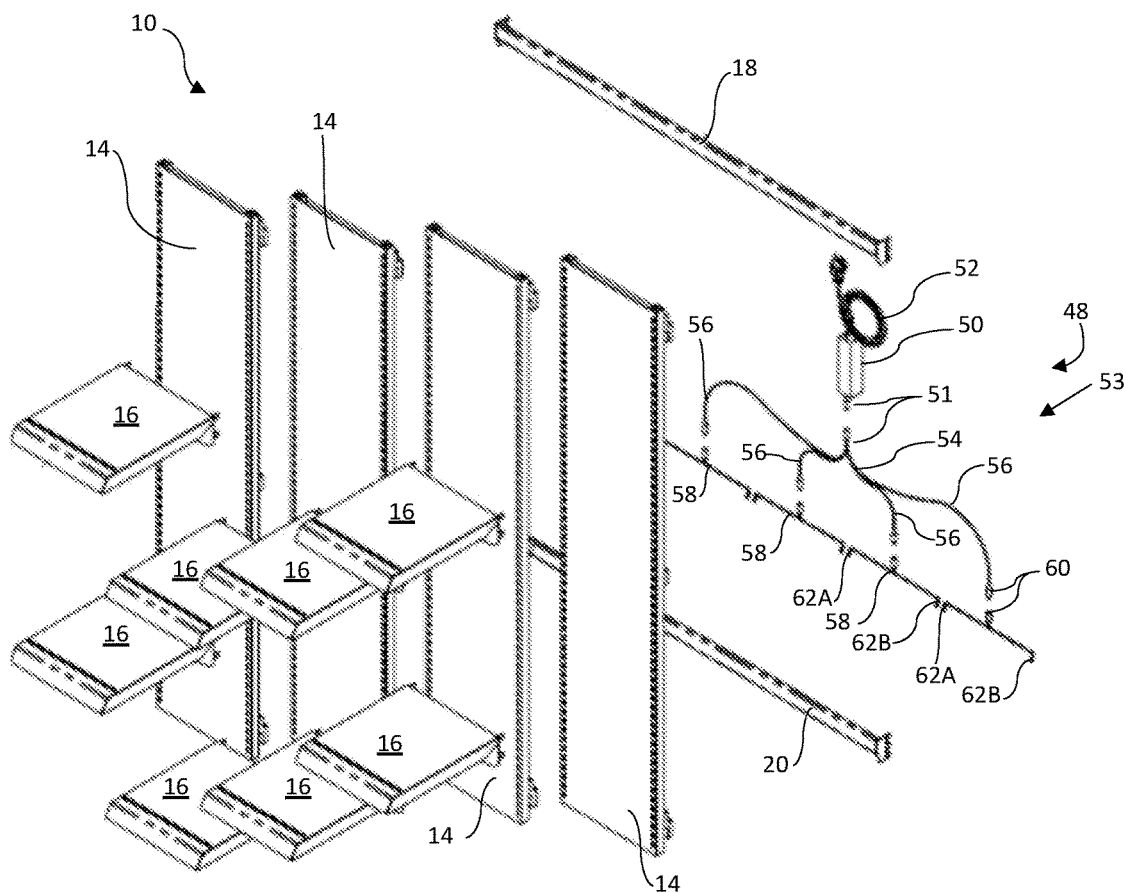
FIG. 5 is an exploded perspective view of the display structure of FIG. 4.

Referring to FIGS. 5 and 8, the rear face 46 of the assembly 10 includes an electrical assembly 48 mounted thereto. The assembly 48 includes a driver 50 mounted to one of the panels 14 on the rear face 36 thereof, with a power input such as adaptor plug-in cable 52 which is connected via a connector 51 through the driver 50 to a cable assembly 53 comprising a spider cable 54. Each branch 56 of the spider cable 54 is connected to a bottom cable 58 via a connector 60. The bottom cable 58 has a pair of opposite ends 62A and 62B. The bottom cables 58 are mounted within the bottom bar 20.

Figure 16:
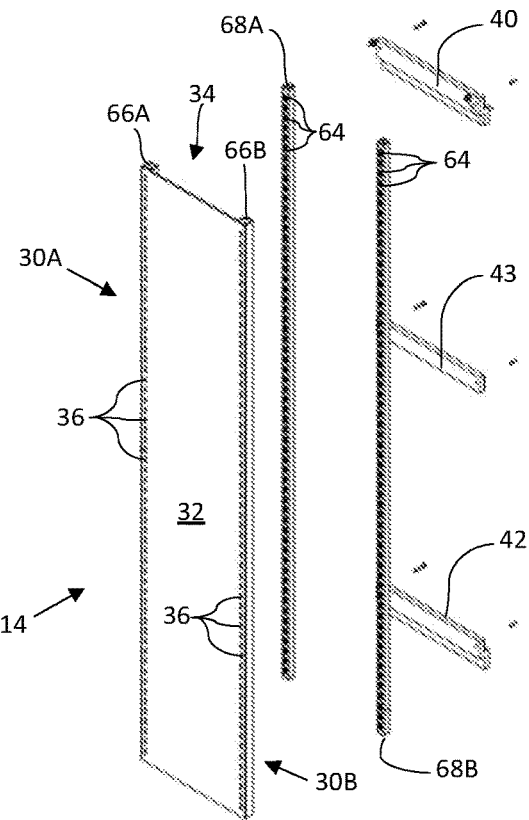
FIG. 16 is an exploded perspective view of the back panel of FIG. 13.

Turning to FIG. 16, the back panel 14 comprises rear elongated channels 66A and 66B formed on the rear side 34 along the vertical height of the back panel 14 and being aligned with the front face apertures 36. In the present non-limiting example, back panel 14 comprises two elongated channels 66A and 66B but it is to be understood that a greater number of vertical elongated channels can be provided along the horizontal width of the rear face 34 of the back panel 14. It is to be also understood, that the back panel 14 can also include one such rear vertical elongated channel. In the present example, the channels 66A and 66B are respectively positioned at or at least near a respective lateral side 30A and 30B.

Each channel 66A and 66B, receives a respective elongated electrical conductor 68A and 68B along the vertical height of the back panel 14. In the example shown here, the elongated electrical conductors 68A and 68B in the form tubular tracks. It is understood that a variety of suitable elongated conductors can be used within the context of the present disclosure and thus the configuration shown here is but one non-limiting illustrative embodiment thereof. A greater or lesser number of elongated electrical conductors per back panel 14 can be contemplated within the scope of the present disclosure depending on the number of back panel rear channels.

The conductors 68A and 68B define respective conductor apertures 64 that are coaligned with respective front face apertures 36 to receive in tandem respective mounting elements 38 (see FIG. 12) of a display member 16. The electrical assembly 48 is in electrical communication with the conductors 68A and 68B to provide electrical power thereto. In one example, the conductors 68A and 66B are to ends 62A and 6B of the bottom cable 58. A variety of electrical assemblies can be connected to the conductors 66A and 66B along the length thereof for providing electrical power thereto.

Turning to FIGS. 10 and 11, each electrical conductor 68A and 68B is secured within a respective channel 66A and 66B. A fastening assembly 70 connects a cable cleat 71 to the outer channel 66B to the inner conductor 66B. The fastening assembly comprises a rear outer fastener 72 which is connected to the cable ends 62A, 62B and is fastened to an inner fastening element 73, positioned within the tubular conductor 68B and which engages the tubular conductor 68B. The fasteners 72 and 73 are conductive elements providing electrical current or power to the conductor 68B.

When powered by the electrical assembly, the electrical conductors 68A and 6B provide for supplying electrical power/current to elements connected thereto.

Turning now to FIGS. 12A and 12B, the display member 16 comprises a conductor 76 in the form of side brackets 78A and 78B comprising rear mounting elements 38 which are in the form of hooks. Each hook 38 is inserted within respective hole defined by the coaligned front face apertures 36 and conductor apertures 64, in the way the hook 38 is mounted to both the channel 66A or 66B and the conductor 68A or 68B. Of course, the channel 66A is made of non-conductive material. Thus, the display member 16 is mounted to the front face 32 of the back panel 16 when its hooks 38 are hooked to the coupled channel and conductor via the coaligned apertures 36 and 64. The hook 38 thus engages the conductor 66A or 66B and when the conductor 66A and 66B is powered by the electrical assembly 48 via its connection thereto, the conductors 66A or 66B provide for powering (i.e. providing electrical current) to the display member conductor 76 in engagement therewith.

Thus conductor 76 provides electrical current to an electrical element 80 mounted to the display member 16. In this example, the display member 16 is a shelf and has a forward opening 82 with an LED element 80 therein connected to brackets 78A and 78B via wiring 84. A reflector 86 protruding from the opening 82 provides for reflecting light. The display member 16 can be provided in a variety of shapes, sizes and types to display articles and the like as required by merchandisers. The electrical element 80 can be of any type requiring power for itself (microphone, speaker etc.) or transmitting power to another element as required by the merchandiser.

The electrical assembly 48 herein can be mounted or integrated to the display structure 12 including the header 24 or base 26 or lateral posts 25 for connecting the electrical assembly 48 to the conductors 68A or 68B or to any top bar 18 or bottom bar 20 or median bar 43 which in turn is connected to the conductors 68A or 68B by way of conductive fasteners or by way of direct contact from wiring as can be contemplated by the skilled artisan.

The posts 25, the header 24, the base 22 form part of the frame structure of the display structure which can be pre-assembled, provided as an assembly for being assembled or provided separately from the modular back panel assembly 10.

The user can thus install one or more back panels 14 on the top and bottom bars 18 and 20 and slide them along the length of the bars 18 and 20 closer to each other or further apart, or attached move bars 18 and 20 in a side by side fashion in order to increase the width of the display structure as desired thereby providing a modifiable and modular backing assembly for a hidden electrified gondola system. The foregoing also facilitates transport of the panel assembly 10 as it is divided in separate panels 14.

Figure 17:
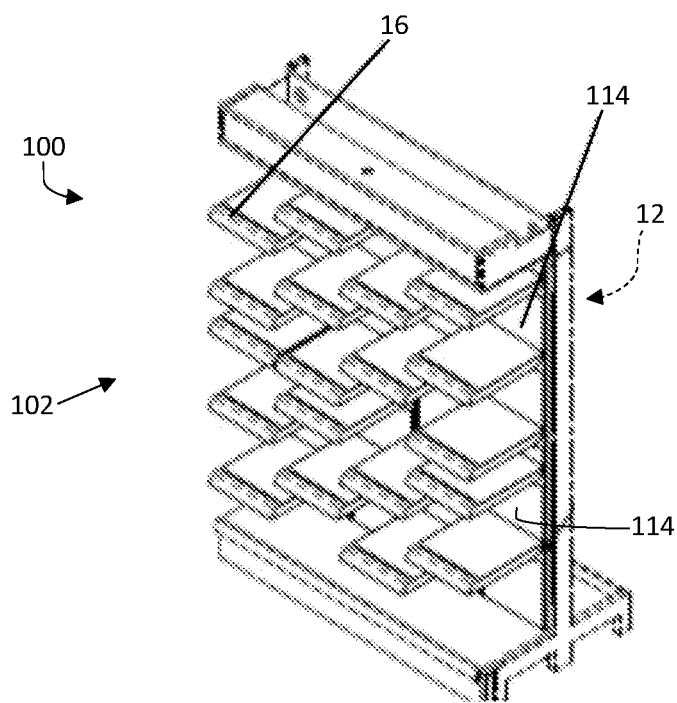
FIG. 17 is a perspective view of a display structure assembly including a modular back assembly in accordance with yet another non-restrictive illustrative embodiment of the present disclosure.

FIG. 17 shows a back panel assembly 100 which mounted to a display structure 112 thereby in accordance with another non-restrictive illustrative embodiment.

The assembly 100 defines a front face 102 with display members 16 and a rear face 104 (see FIG. 18) with an electrical assembly 106.

Figure 18:
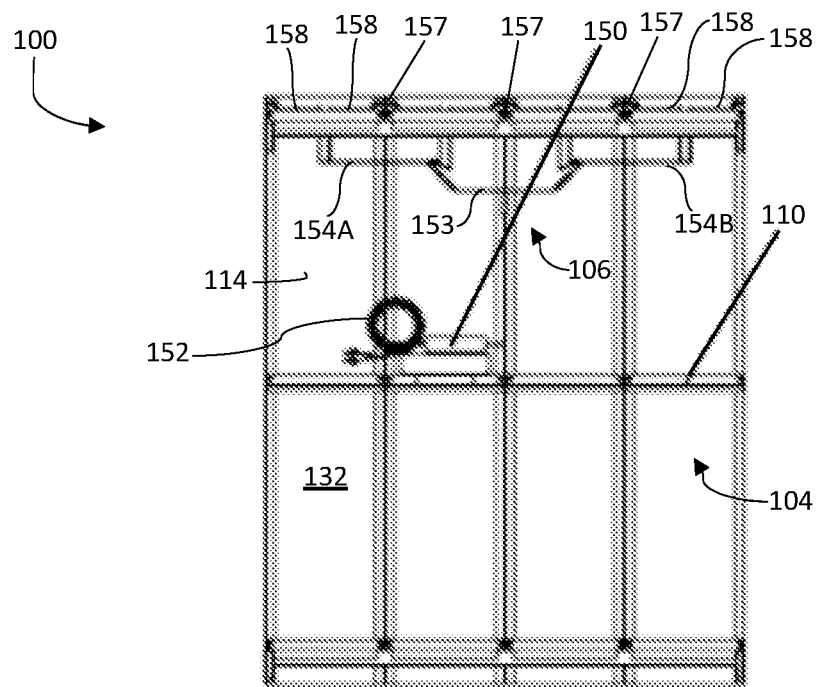
FIG. 18 is a read view of the display structure of FIG. 17.
Figure 19:
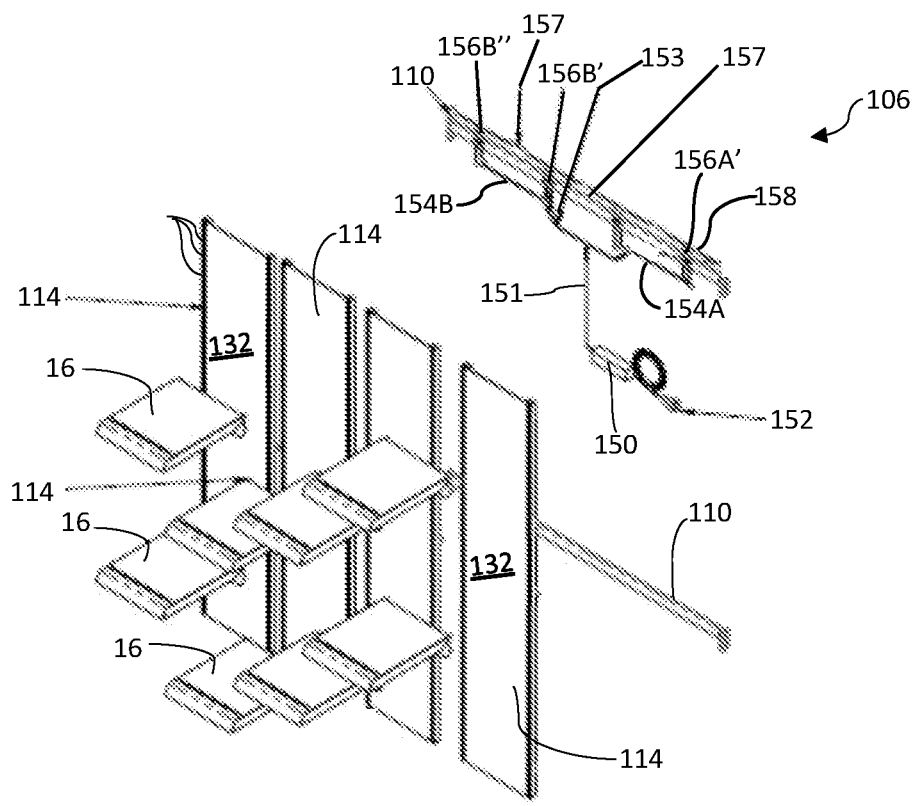
FIG. 19 is a front, perspective, exploded view of the modular back assembly of the display structure of FIG. 1.

With respect to FIGS. 18 and 19, the electrical assembly 106 includes a driver 150 mounted to one of the panels 114 on the rear face 134 thereof, with an input (power adaptor plug-in cable) 152 which is connected via a connector 151 through the driver 150 to a two-way split cable 153, which is further connected to a two four-way split cable 154A and 154B. Each four-way split cable 154A and 154B has two respective splitters, namely 156A' and 156A" for cable 154A and splitters 1566' and 156B" for cable 154B. The top ends 162 of an elongated vertical tubular electrical conductors 168A or 168B (see FIG. 20) are connected to a connector 157 which is connected to two cables 158 from each side. The connector 157 is shown to be connected to a cable 158 from splitter 1566" and to a cable 158 from splitter 1566'. The connector 157 is shown to be connected to a cable 158 from splitter 1566' and to a cable 158 from splitter 156A". The connector 157 is shown to be connected to a cable 158 from splitter 156A" and to a cable 158 from splitter 156A'. The connector 157 is shown to be connected to a cable 158 from splitter 156A' and to a cable 158 from splitter 1566".

Figure 20:
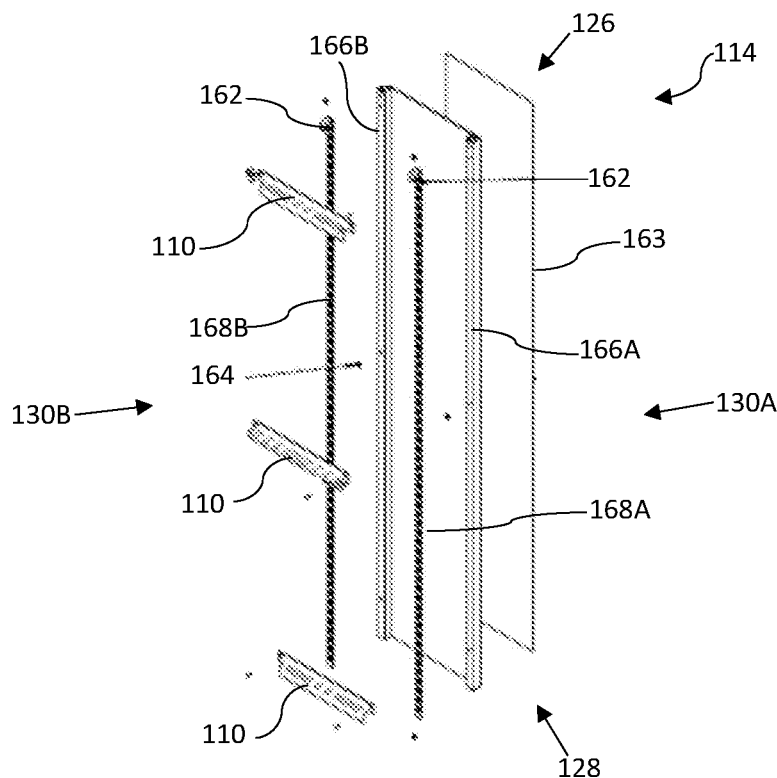
FIG. 20 is a rear, perspective exploded view of the back panel of he modular back assembly of FIG. 19.

With reference to FIG. 20, there is a shown a back panel 114 defining top and bottom ends 126 and 128, respectively, opposite lateral sides 130A and 1306 and front and rear faces, 132 and 134 (see also FIG. 18), respectively. Front face 132 includes front face apertures 135 (see FIG. 19) for receiving the mounting members 38 of a display member 16. The front side 132 is defined by front panel part 163. The rear side 134 of back panel 114 includes a main panel body 164 with rear channels 166A and 1666 formed at each lateral side 130A and 1306. Each channel 166A and 1666, receives a respective electrical support element such as an electrical channel or an electrical track 168A and 1686 therein, each track 168A and 1686 being in electrical communication with the electrical assembly for electrifying the assembly 100.

Support braces 110 are mounted to the rear side 104 of the assembly 100.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A modular back panel assembly for a display structure, the modular back panel assembly comprising:

at least one back panel for being mounted to the display structure and defining respective lateral sides, top and bottom ends, front and rear faces, a horizontal width between the lateral sides and a vertical height between the top and bottom ends, the front face defining front face apertures along the vertical height, the rear face being mountable to the display structure and comprising at least one elongated channel along the vertical height in alignment with the front face apertures;

at least one elongated electrical conductor removably mountable within the elongated channel along the vertical height and defining conductor apertures for being coaligned with the front face apertures when the elongated electrical conductor is mounted within the elongated channel;

at least one display member for being mounted to the front face of the back panel and comprising a display member electrical conductor comprising at least one mounting element being insertable within the coaligned front face and conductor apertures;

an electrical assembly for being in electrical communication with the elongated electrical conductor to provide electrical power thereto, wherein insertion of the mounting element within the coaligned front face and conductor apertures provides for mounting the display member to the front face and for electrical communication between the display member electrical conductor and the elongated electrical conductor for allowing the elongated electrical conductor when electrically powered by the electrical assembly to provide electrical power to the display member electrical conductor; and a plurality of the back panels for being mounted side by side to the display structure, the electrical assembly being mountable to the back panel assembly at the rear faces of the plurality of the back panels and comprising a power input connected to a driver connected to a cable assembly comprising connecting ends for being in electrical communication with the elongated electrical conductor of each one of the plurality of the back panels to provide electrical power thereto.

2. A modular back panel assembly according to claim 1, wherein the at least one back panel comprises at least two elongated channels on the rear face thereof along the vertical height respectively positioned at or near a respective one of the lateral sides and respectively aligned with respective ones of the front face apertures.

3. A modular back panel according to claim 2, further comprising at least two elongated electrical conductors defining respective conductor apertures and being respectively mountable to respective ones of the at least two elongated channels along the vertical height for aligning the respective conductor apertures thereof with the respective ones of the front face apertures.

4. A modular back panel assembly according to claim 1, further comprising a connecting member mountable to the elongated channel of each one of the plurality of the back panels rear faces of the plurality of back panels and in electrical communication with the connecting ends of the cable assembly.

5. A modular back panel assembly according to claim 1, wherein the at least one display member comprises an electrical element for further providing electrical power to another article.

6. A display structure assembly comprising:
a frame structure assembly; and
a modular back panel assembly for being mounted to the frame structure, the modular back panel assembly comprising:
at least one back panel for being mounted to the frame structure assembly and defining respective lateral sides, top and bottom ends, front and rear faces, a horizontal width between the lateral sides and a vertical height between the top and bottom ends, the front face defining front face apertures along the vertical height, the rear face being mountable to the display structure and comprising at least one elongated channel along the vertical height in alignment with the front face apertures;
at least one elongated electrical conductor removably mountable within the elongated channel along the vertical height and defining conductor apertures for being coaligned with the front face apertures when the elongated electrical conductor is mounted within the elongated channel;
at least one display member for being mounted to the front face of the back panel and comprising a display member electrical conductor comprising at least one mounting element being insertable within the coaligned front face and conductor apertures;

an electrical assembly for being in electrical communication with the elongated electrical conductor to provide electrical power thereto, wherein insertion of the mounting element within the coaligned front face and conductor apertures provides for mounting the display member to the front face and for electrical communication between the display member electrical conductor and the elongated electrical conductor for allowing the elongated electrical conductor when electrically powered by the electrical assembly to provide electrical power the display member electrical conductor; and a plurality of the back panels for being mounted side by side to the display structure, the electrical assembly being mountable to the back panel assembly at the rear faces of the plurality of the back panels and comprising a power input connected to a driver connected to a cable assembly comprising connecting ends for being in electrical communication with the elongated electrical conductor of each one of the plurality of the back panels to provide electrical power thereto.

7. A display structure assembly according to claim 6, wherein the at least one back panel comprises at least two elongated channels on the rear face thereof along the vertical height respectively positioned at or near a respective one of the lateral sides and respectively aligned with respective ones of the front face apertures.

8. A display structure assembly according to claim 7, further comprising at least two elongated electrical conductors defining respective conductor apertures and being respectively mountable to respective ones of the at least two elongated channels along the vertical height for aligning the respective conductor apertures thereof with the respective ones of the front face apertures.

9. A display structure assembly according to claim 6, further comprising a connecting member mountable to the elongated channel of each one of the plurality of the back panels rear faces of the plurality of back panels and in electrical communication with the connecting ends of the cable assembly.

10. A display structure assembly according to claim 6, wherein the at least one display member comprises an electrical element for further providing electrical power to another article.

11. A display structure comprising:
a frame structure assembly; and
a modular back panel assembly mounted to the frame structure, the modular back panel assembly comprising:
at least one back panel mounted to the frame structure and defining respective lateral sides, top and bottom ends, front and rear faces, a horizontal width between the lateral sides and a vertical height between the top and bottom ends, the front face defining front face apertures along the vertical height, the rear face being mounted to the display structure and comprising at least one elongated channel along the vertical height in alignment with the front face apertures;
at least one elongated electrical conductor mounted within the elongated channel along the vertical height and defining conductor apertures being coaligned with the front face apertures;

at least one display member mounted to the front face of the back panel and comprising a display member electrical conductor comprising at least one mounting element inserted within the coaligned front face and conductor apertures;

an electrical assembly being in electrical communication with the elongated electrical conductor to provide electrical power thereto, wherein the mounting element within the coaligned front face and conductor apertures provides for mounting the display member to the front face and for electrical communication between the display member electrical conductor and the elongated electrical conductor for allowing the elongated electrical conductor when electrically powered by the electrical assembly to provide electrical power the display member electrical conductor; and plurality of the back panels mounted side by side to the display structure, the electrical assembly mounted to the back panel assembly at the rear faces of the plurality of the back panels and comprising a power input connected to a driver connected to a cable assembly comprising connecting ends in electrical communication with the elongated electrical conductor of each one of the plurality of the back panels to provide electrical power thereto.

12. A display structure according to claim 11, wherein the at least one back panel comprises at least two elongated channels on the rear face thereof along the vertical height respectively positioned at or near a respective one of the lateral sides and respectively aligned with respective ones of the front face apertures.

13. A display structure according to claim 12, further comprising at least two elongated electrical conductors defining respective conductor apertures and being respectively mounted to respective ones of the at least two elongated channels along the vertical height and wherein the respective conductor apertures thereof are aligned with the respective ones of the front face apertures.

14. A display structure according to claim 11, further comprising a connecting member mounted to the elongated channel of each one of the plurality of the back panels rear faces of the plurality of back panels and in electrical communication with the connecting ends of the cable assembly.

15. A display structure according to claim 11, wherein the at least one display member comprises an electrical element for further providing electrical power to another article.

* * * * *